United States Patent
Ahn

(10) Patent No.: US 10,424,442 B2
(45) Date of Patent: *Sep. 24, 2019

(54) ARC ELIMINATOR

(71) Applicant: LSIS CO., LTD., Anyang-si, Gyeonggi-do (KR)

(72) Inventor: Kwanghyeon Ahn, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 450 days.

This patent is subject to a terminal disclaimer.

(21) Appl. No.: 15/334,199

(22) Filed: Oct. 25, 2016

(65) Prior Publication Data

US 2017/0263390 A1    Sep. 14, 2017

(30) Foreign Application Priority Data

Mar. 11, 2016    (KR) .................. 10-2016-0029277

(51) Int. Cl.
| | | |
|---|---|---|
| *H02H 3/00* | (2006.01) | |
| *H01H 9/30* | (2006.01) | |
| *H01H 9/50* | (2006.01) | |
| *H02B 11/10* | (2006.01) | |
| *H02B 11/28* | (2006.01) | |

(52) U.S. Cl.
CPC .............. *H01H 9/30* (2013.01); *H01H 9/50* (2013.01); *H02B 11/10* (2013.01); *H02B 11/28* (2013.01)

(58) Field of Classification Search
None
See application file for complete search history.

(56) References Cited

U.S. PATENT DOCUMENTS

| | | | |
|---|---|---|---|
| 4,016,384 A * | 4/1977 | LeRow, Jr. | H01H 9/16 200/308 |
| 5,294,905 A | 3/1994 | Pimpis | |
| 5,337,210 A * | 8/1994 | Ishikawa | H02B 11/133 200/308 |
| 10,163,587 B2 * | 12/2018 | Lee | H01H 9/30 |
| 2014/0174898 A1 | 6/2014 | Matsunaga et al. | |

FOREIGN PATENT DOCUMENTS

| | | |
|---|---|---|
| CN | 102870297 A | 1/2013 |
| CN | 103178465 A | 6/2013 |
| DE | 1046138 | 12/1958 |

(Continued)

OTHER PUBLICATIONS

European Patent Office Application Serial No. 16191365.2, Search Report dated May 26, 2017, 6 pages.

(Continued)

*Primary Examiner* — Stephen W Jackson
(74) *Attorney, Agent, or Firm* — K&L Gates LLP

(57) ABSTRACT

An arc eliminator includes a housing having a space formed therein and including an opening, an arc extinguishing part installed in the housing and including a moving rod disposed to be movable to the space, an indicator rotatably installed within the housing and seen through the opening, and an indicator rotating mechanism interworking with the moving rod when the moving rod moves, to rotate the indicator. A closing state and opening state of an arc extinguishing part may be easily recognized through an indicator and an arc accident may be minimized.

11 Claims, 12 Drawing Sheets

(56) References Cited

FOREIGN PATENT DOCUMENTS

| | | |
|---|---|---|
| EP | 1971007 | 9/2008 |
| JP | 2006093005 A | 4/2006 |
| JP | 2015049939 | 3/2015 |
| WO | 2008153578 | 12/2008 |
| WO | 2011116985 | 9/2011 |
| WO | 2014086587 | 6/2014 |

OTHER PUBLICATIONS

Korean Intellectual Property Office Application No. 10-2016-0029277, Office Action dated May 22, 2017, 17 pages.
Chinese Office Action for related Chinese Application No. 201611207714.5; action dated Jun. 4, 2018; (7 pages).
The Korean Institute of Patent Information, Search Report dated Oct. 8, 2015, 4 pages.
Chinese Office Action for related Chinese Application No. 201611207714.5; action dated Feb. 12, 2019; (7 pages).

* cited by examiner

ARC ELIMINATOR

CROSS-REFERENCE TO RELATED APPLICATION

Pursuant to 35 U.S.C. § 119(a), this application claims the benefit of earlier filing date and right of priority to Korean Patent Application No. 10-2016-0029277, filed on Mar. 11, 2016, the contents of which are all hereby incorporated by reference herein in its entirety.

BACKGROUND OF THE INVENTION

1. Field of the Invention

The present disclosure relates to an arc eliminator, and more particularly, to an arc eliminator having a moving rod that moves.

2. Background of the Invention

In general, a distribution board (i.e., an incoming panel or a switchgear) is a facility that receives electric power and supplies electric power required for a load facility installed in a consumer. The distribution board may convert power of high voltage into power of low voltage and distribute the same. The distribution board may include a switch, a lightning arrester, a transformer, a circuit breaker, and various measurement equipment. An arc eliminator may be installed within the distribution board.

In a normal state of the arc elminator, two electrodes (a high voltage electrode and a ground electrode) are maintained to be electrically insulated in an open state (non-conduction state), and when an arc accident occurs in the distribution board, the arc eliminator rapidly electrically connects the two electrodes to short and ground each of three phases of an electrical power system and eliminate an arc.

The arc eliminator may include an arc extinguishing part, and the arc extinguishing part may be filled with SF6, an inert insulation gas having excellent insulation characteristics within a case thereof so as to insulate the interior of the arc extinguishing part with the insulating material. In the arc extinguishing part, two electrodes, i.e., a high voltage electrode and a ground electrode, are installed to be spaced apart from each other within the case formed with an insulating material, and a movable electrode may be installed to be varied in position within the case.

The high voltage electrode of the arc extinguishing part is connected to a fixed bus bar provided in the distribution board and high voltage power may be constantly applied thereto.

The ground electrode of the arc extinguishing part may be connected to a ground of a location where the distribution board is installed through a ground bus bar or a ground cable.

The arc eliminator may have a closing mode in which the high voltage electrode and the ground electrode are conducted by the movable electrode and an opening mode (or a return mode) in which the high voltage electrode and the ground electrode are maintained to be insulated, rather than being conducted by the movable electrode.

When the arc eliminator is in the closing mode, the movable electrode of the arc extinguishing part may move to come into contact with the high voltage electrode and the ground electrode to conduct the high voltage electrode and the ground electrode.

When the arc eliminator is in the opening mode (or in the return mode), the movable electrode of the arc extinguishing part may move not to contact at least one of the high voltage electrode and the ground electrode to insulate the high voltage electrode and the ground electrode.

When the system of the distribution board is in an activated state, the high voltage electrode of the arc eliminator may be led in to be connected to the fixed bus bar, and here, the arc eliminator should be in an open state.

When the arc eliminator is in the closing state, the high voltage electrode and the ground electrode are conducted, and thus, if the arc eliminator is led in in the closing state, an arc accident may occur.

SUMMARY OF THE INVENTION

Therefore, an aspect of the detailed description is to provide an arc eliminator capable of minimizing an arc accident by outwardly displaying a contact state within an arc extinguishing part.

To achieve these and other advantages and in accordance with the purpose of this specification, as embodied and broadly described herein, an arc eliminator may include: a housing having a space formed therein and including an opening; an arc extinguishing part installed in the housing and including a moving rod disposed to be movable to the space; an indicator rotatably installed within the housing and seen through the opening; and an indicator rotating mechanism interworking with the moving rod when the moving rod moves, to rotate the indicator.

The indicator may include a first indicator seen through the opening when the moving rod moves toward the outside of the arc extinguishing part; and a second indicator seen through the opening when the moving rod moves toward an interior of the arc extinguishing part.

The indicator may be configured as a polyhedron, the first indicator may be formed on a first surface of the polyhedron, and the second indicator may be formed on a second surface of the polyhedron perpendicular to the first surface of the polyhedron.

The indicator may be positioned within the housing.

The indicator rotating mechanism may include: a rotary link rotatably supported in the housing and rotated centered around a first rotational shaft when the moving rod moves; and a connection link connected to the rotary link and moving forwards and backwards when the rotary link rotates, and connected to the indicator by a second rotational shaft to rotate the indicator.

A first rotational shaft supporter having a through hole formed to allow the first rotational shaft to rotatably penetrate therethrough may be disposed within the housing.

The moving rod may include: a rod disposed to move forwards and backwards in the arc extinguishing part; and a contact body installed on one side of the rod and contacting the rotary link.

The rotary link may include: a first link portion installed in the first rotational shaft and contacting an outer end of the contact body; and a second link portion installed in the first rotational shaft and allowing the connection link to be connected thereto.

The arc eliminator may further include: a support installed in the housing and rotatably supporting the indicator.

The arc eliminator may further include: an elastic member connected to the support and the second connection shaft.

The support may include an elastic member connection shaft to which one end portion of the elastic member is connected.

According to an embodiment of the present disclosure, a closing state and an opening state of the arc extinguishing part may be easily recognized from outside through the indicator, and an arc accident may be minimized.

Also, since the indicator interworks with the moving body so as to be rotatably operated, the indicator may be mechanically operated without a power source such as a motor for rotating the indicator, and power consumption may be reduced, compared with a case in which the indicator is rotated using a power source such as a motor.

In addition, the indicator may be rotatably operated by a simple structure of the rotary link and the connection link.

Moreover, since the elastic member returns the indicator when external force does not act on the moving body, the rotary link, and the connection link, the indicator may be returned to its original position without a separate power source and power consumption and costs may be minimized.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a specific embodiment of the present disclosure will be described in detail with reference to the accompanying drawings.

Figure 1:
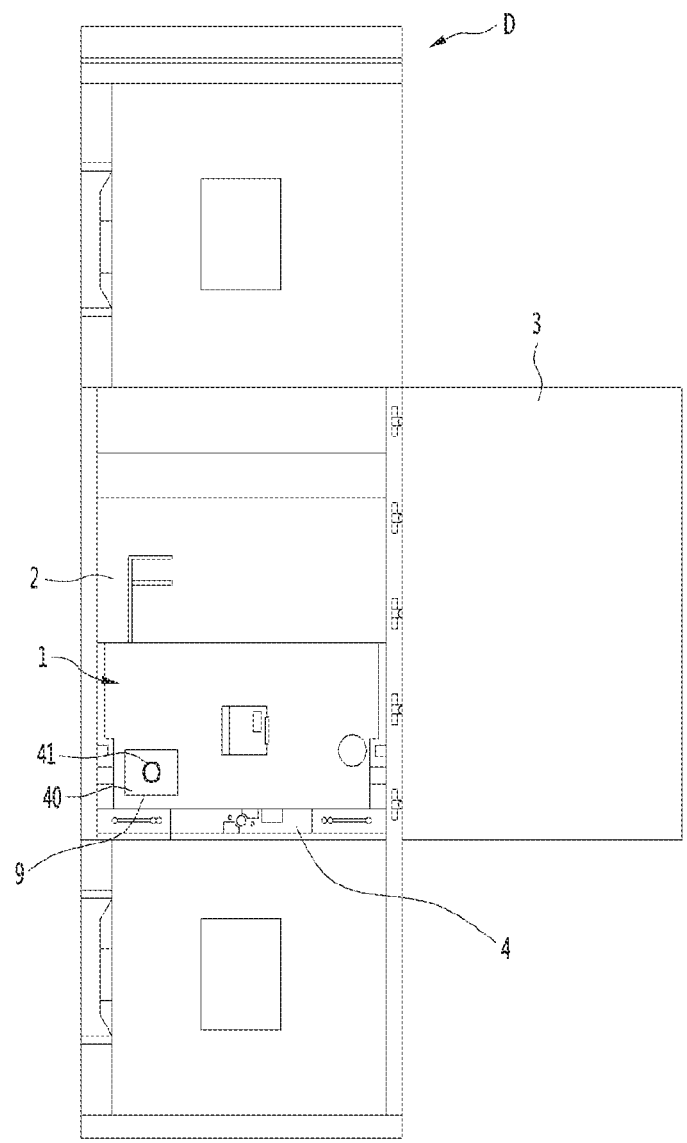
FIG. 1 is a front view when an arc eliminator according to an embodiment of the present disclosure is in an opening state.
Figure 2:
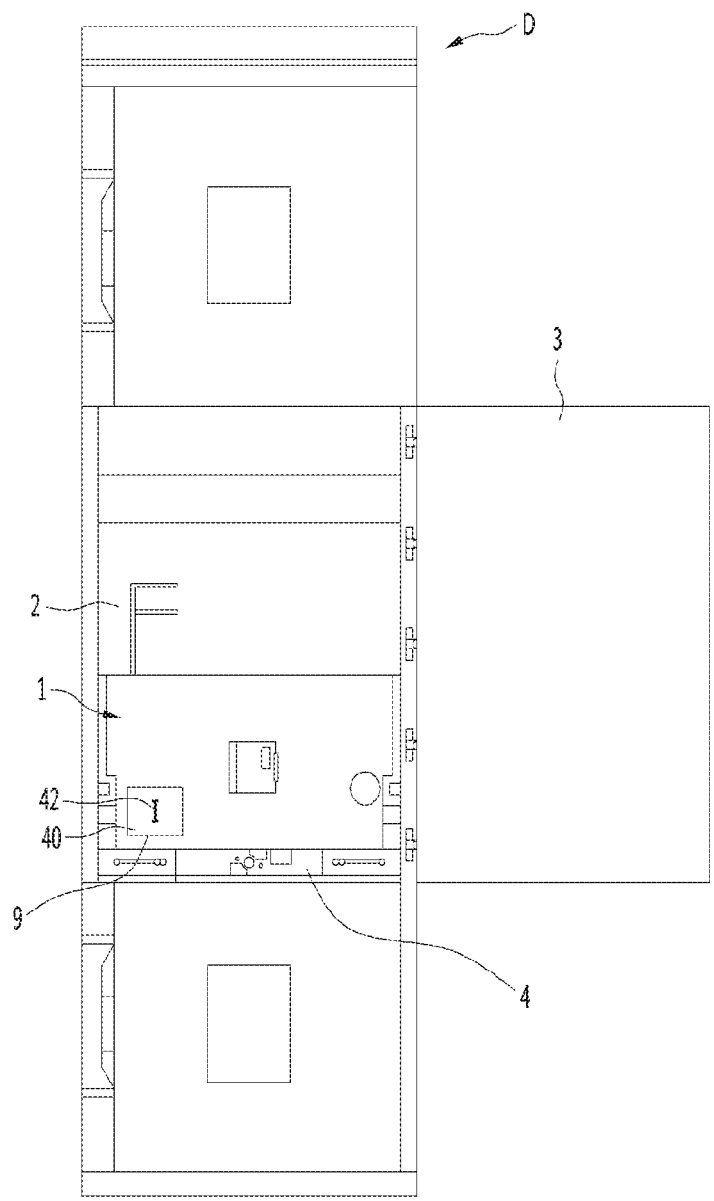
FIG. 2 is a front view when an arc eliminator according to an embodiment of the present disclosure is in a closing state.
Figure 3:
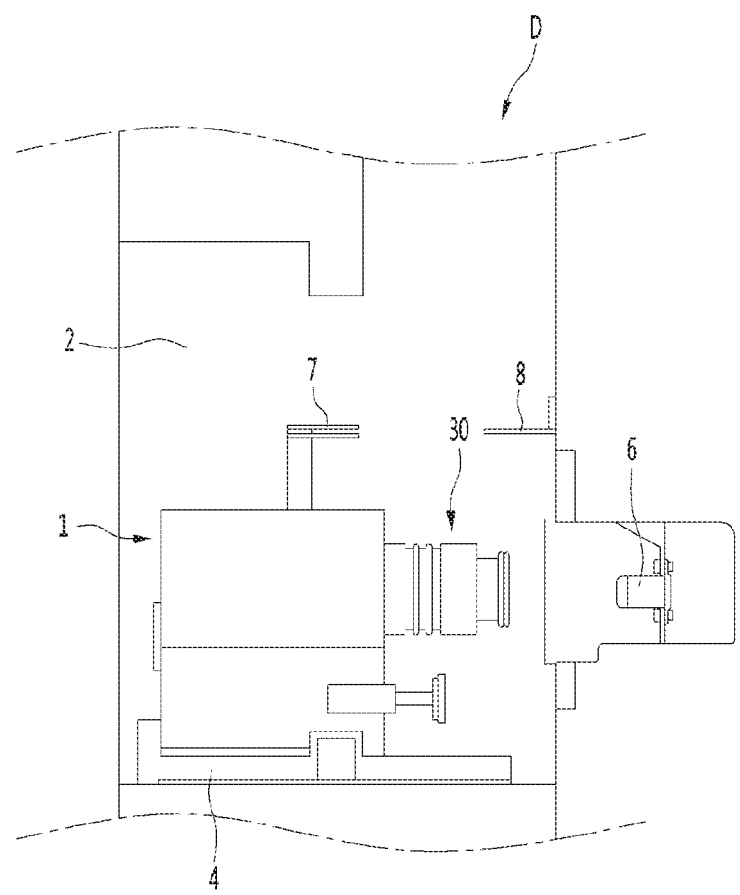
FIG. 3 is a side view illustrating an interior of a distribution board when an arc eliminator according to an embodiment of the present disclosure is in a led-out position.
Figure 4:
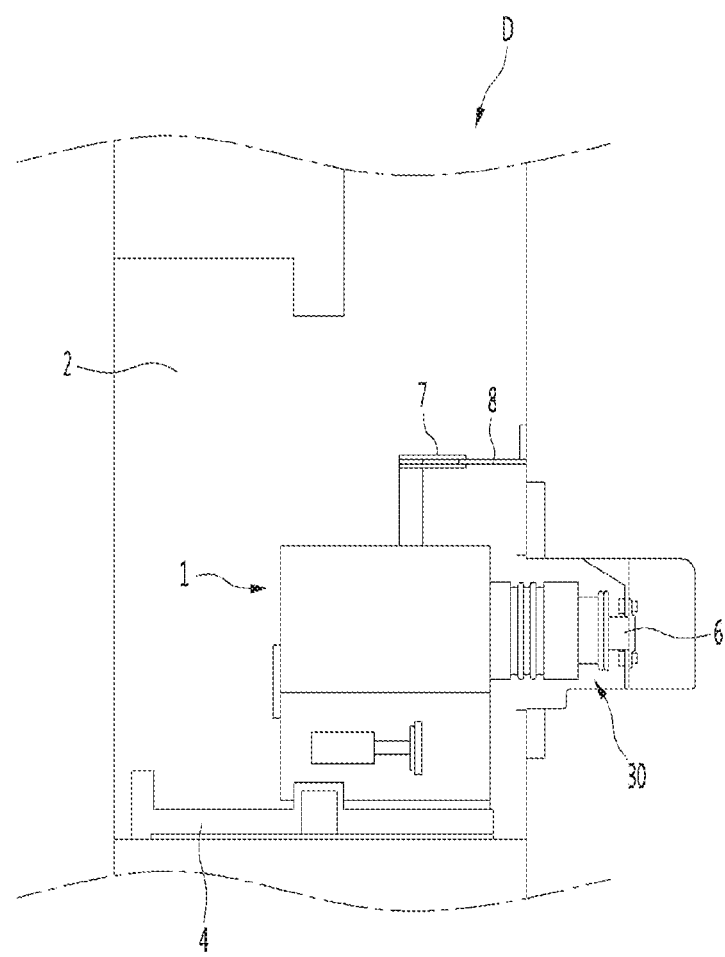
FIG. 4 is a side view illustrating an interior of a distribution board when an arc eliminator according to an embodiment of the present disclosure is in a led-in position.

FIG. 1 is a front view when an arc eliminator according to an embodiment of the present disclosure is in an opening state, FIG. 2 is a front view when an arc eliminator according to an embodiment of the present disclosure is in a closing state, FIG. 3 is a side view illustrating an interior of a distribution board when an arc eliminator according to an embodiment of the present disclosure is in a led-out position, and FIG. 4 is a side view illustrating an interior of a distribution board when an arc eliminator according to an embodiment of the present disclosure is in a led-in position.

In a distribution board D, an arc eliminator accommodation chamber 2 accommodating an arc eliminator 1 may be formed. The distribution board D may include an distribution board door 3 opening and closing the arc eliminator accommodation chamber 2.

The distribution board D may further include a carriage 4 for drawing in and drawing out the arc eliminator 1. The arc eliminator 1 may move in a forward/backward direction on the carriage 4.

The arc eliminator 1 may include an arc extinguishing part 30 for extinguishing an arc.

A fixed bus bar 6 (a distribution board bus bar) which the arc extinguishing part 30 is connected to or separated from may be provided within the distribution board.

The arc extinguishing part 30 may be provided to protrude from a rear portion of the arc eliminator 1 in a backward direction. When the arc eliminator 1 is in an advancing position as illustrated in FIG. 3, the arc extinguishing part 30 may be separated from the fixed bus bar 6. When the arc eliminator 1 is in a retreating position as illustrated in FIG. 4, the arc extinguishing part 30 may be connected to the fixed bus bar 6.

The arc eliminator 1 may have a ground contact 7 provided on one side thereof. The ground contact 7 may be disposed to protrude from an upper portion of the arc eliminator 1. A ground bus bar 8 connected to the ground contact 7 may be provided within the distribution board D. When the arc eliminator 1 moves backwards, the ground contact 7 may be brought into contact with the ground bus bar 8. When the arc eliminator 1 moves forwards as illustrated in FIG. 3, the ground contact 7 may be separated from the ground bus bar 8. When the arc eliminator 1 moves backwards as illustrated in FIG. 4, the ground contact 7 may be brought into contact with the ground bus bar 8.

A detection unit (not shown) such as an optical sensor, or the like, for detecting an arc accident may be installed within the distribution board D. When the detection unit detects an arc accident, an arc protection relay (not shown) installed in the distribution board D may output a control signal to an arc eliminator controller (not shown) installed in the distribution board D and the arc eliminator controller may control the arc extinguishing part 30 of the arc eliminator 1 to perform a closing operation (i.e., the arc eliminator controller may control the arc extinguishing part 30 of the arc eliminator 1 to remove generated arc).

Meanwhile, when the distribution board door 3 is opened as illustrated in FIGS. 1 and 2, a front side of the arc eliminator 1 may be exposed to the outside. The arc eliminator 1 may include an indicator 40 able to indicate whether the arc eliminator is closed or open.

With the distribution board door 3 opened, a manager such as a user, and the like, (hereinafter, referred to as a "manager") may easily recognize whether the arc eliminator 1 is in a closing state or in an opening state (or a return state) upon viewing the indicator 40, and may pay attention to a lead-in operation or a lead-out operation of the arc eliminator 1.

The indicator 40 may have a first indicator 41 indicating an opening state and a second indicator 42 indicating a closing state. When the arc eliminator 1 is open, the first indicator 41 as illustrated in FIG. 3 may be seen externally and when the arc eliminator 1 is closed, the second indicator 42 as illustrated in FIG. 4 may be seen outwardly.

The first indicator 41 and the second indicator 42 are provided to be distinguished from each other on the outside, and may have various characters, numbers, or symbols indicated to be different from each other and may be distinguished from each other in different colors. Any indicators may be applied as long as they can be distinguished from each other when viewed from the outside.

The indicator 40 may be provided within the arc eliminator 1 or in a front plate part of the arc eliminator 1. When the indicator 40 is disposed within the arc eliminator 1, an opening 9 or a window allowing the indicator 40 disposed within the arc eliminator 1 to be visible from the outside may be provided in the front plate part of the arc eliminator 1.

Figure 5:
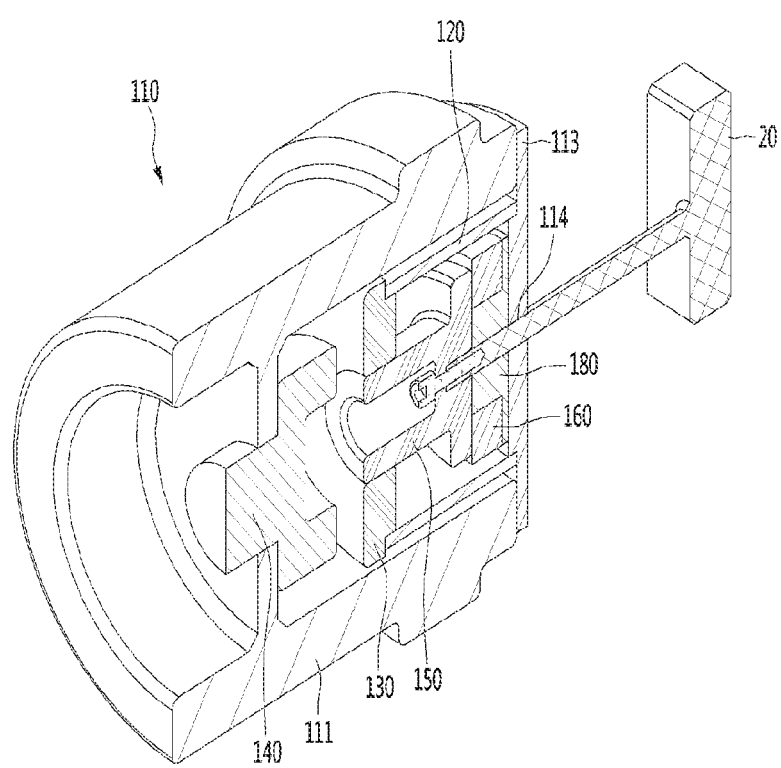
FIG. 5 is a partially cutaway perspective view illustrating an example of an arc extinguishing part of an arc eliminator according to an embodiment of the present disclosure.
Figure 6:
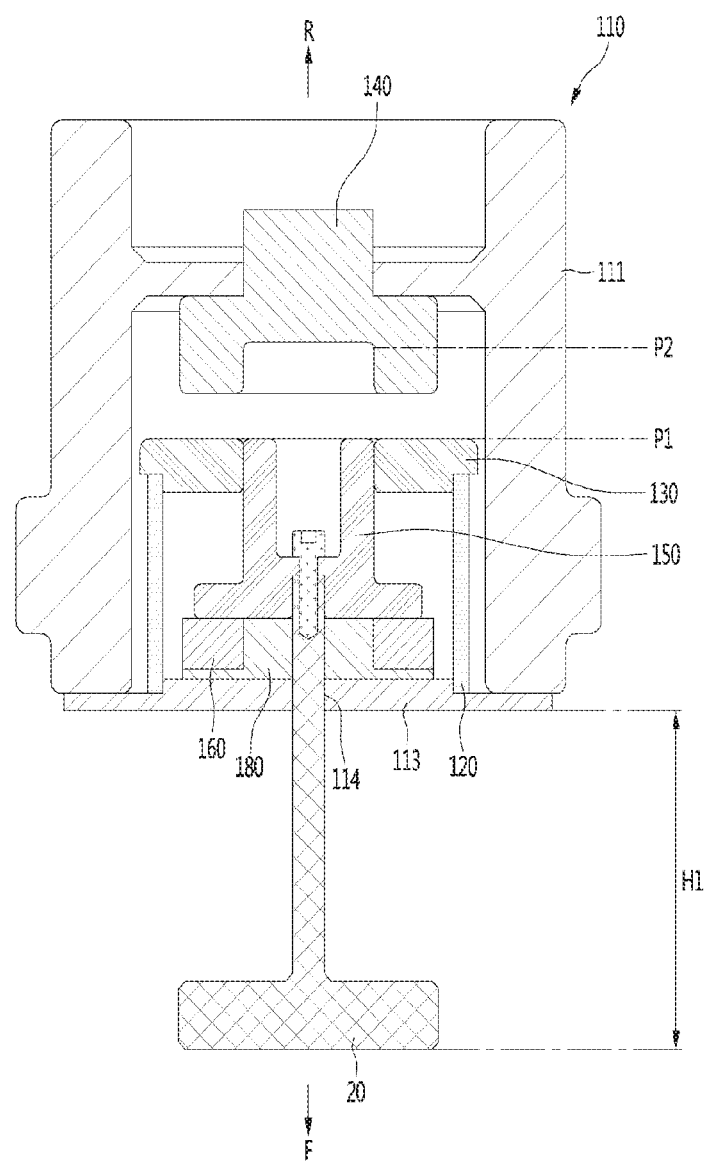
FIG. 6 is a cross-sectional view when an example of an arc extinguishing part of an arc eliminator according to an embodiment of the present disclosure is open.
Figure 7:
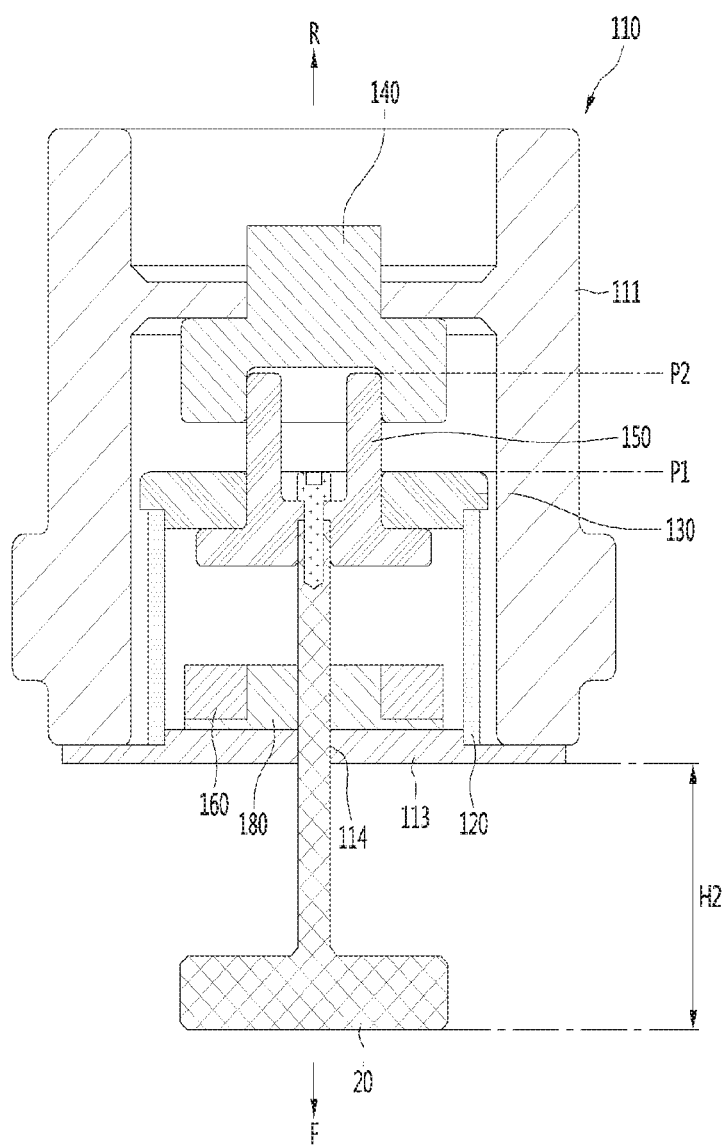
FIG. 7 is a cross-sectional view when an example of an arc extinguishing part of an arc eliminator according to an embodiment of the present disclosure is closed.

FIG. 5 is a partially cutaway perspective view illustrating an example of an arc extinguishing part of an arc eliminator according to an embodiment of the present disclosure, FIG. 6 is a cross-sectional view when an example of an arc extinguishing part of an arc eliminator according to an embodiment of the present disclosure is open, and FIG. 7 is a cross-sectional view when an example of an arc extinguishing part of an arc eliminator according to an embodiment of the present disclosure is closed.

The arc extinguishing part 30 may be a high speed closing switch assembly.

The arc extinguishing part 30 may include a case 110, a ground electrode 130 disposed within the case 110, a high voltage electrode 140 disposed within the case 110, a movable electrode 150 disposed within the case 110, and a movable electrode moving mechanism 160 moving forwards and backwards the movable electrode 150.

The arc extinguishing part 30 may include a moving rod 20 operated to be moved backwards and forwards together with the movable electrode 150. A portion of the moving rod 20 may be positioned within the case 110 and connected to the movable electrode 150, and the other remaining portion thereof may be disposed to protrude outwardly from the case 110.

An interior of the case 110 may be hermetically closed so as to be filled with an insulation gas. A front side and a rear side of the interior of the case 110 may be opened. The case 110 may include a body part 111 forming an appearance and a front case 113 formed on a front side of the body part 111 to cover the opened front side of the body part 111.

The arc extinguishing part 30 may further include a pipe 120 disposed within the case 110. The pipe 120 may be positioned behind the front case 113 or may be disposed to surround at least a portion of the ground electrode 130. The pipe 120 surrounds the ground electrode 130 to protect the same and may be formed of a conductor to serve as a conductor.

The ground electrode 130 may be coupled to a rear portion of the pipe 120.

The high voltage electrode 140 may be provided in a rear portion within the case 110.

The high voltage electrode 140 and the ground electrode 130 may be disposed to be spaced apart from each other in a forward/backward direction within the case 110.

The ground electrode 130 may be directly connected to the ground contact 7 illustrated in FIGS. 3 and 4 or may be electrically connected to the ground contact 7 through a separate connector.

As illustrated in FIGS. 3 and 4, the high voltage electrode 140 may directly contact with the fixed bus bar 6 installed within the distribution board or may contact the fixed bus bar 6 through a separate contactor.

The movable electrode 150 is movably provided within the case 110.

Within the case 110, the movable electrode 150 may be moved to an opening position P1 in which the ground electrode 130 and the high voltage electrode 140 are not connected as illustrated in FIG. 6, and to a closing position P2 in which the ground electrode 130 and the high voltage electrode 140 are connected to each other as illustrated in FIG. 7.

The movable electrode 150 may be provided to contact an inner wall of a hollow of the ground electrode 130 and movable in a forward/backward direction within the case 110. The movable electrode 150 may be moved in a forward direction F toward the opening position P1 and may be moved in a backward direction R toward the closing position P2.

The movable electrode moving mechanism 160 may include an actuator for moving the movable electrode 150 forwards or backwards.

The actuator may be controlled by the arc eliminator controller (not shown) installed in the distribution board D, and when a closing signal is input from the arc eliminator controller to the actuator, the actuator may generate electromagnetic force to linearly move the movable electrode 150.

The actuator may be configured as a Thompson coil actuator. The Thompson coil actuator may be configured by winding a coil in a ring shape, and when power is applied to the Thompson coil actuator, the Thompson coil actuator may generate electromagnetic force.

When power is applied to the Thompson coil actuator, a current flows in the coil wound in the ring shape to generate an electromagnetic force. The movable electrode 150 may be moved from the opening position P1 to the closing position P2 by the electromagnetic force or may be moved from the closing position P2 to the opening position P1.

The actuator may be provided in a support member 180 disposed on a rear surface of the front case 113 of the case 110.

An electric circuit of an incoming panel, a distribution panel, or a distribution board may be connected to a ground side by the high voltage electrode 140, the ground electrode 130, and the movable electrode 150, and when a fault current such as an arc, or the like, occurs in the electric circuit, the fault current may rapidly bypass to flow toward a ground side, rather than flowing in the electric circuit.

The moving rod 20 may be disposed such that one end thereof is coupled to the movable electrode 150 and the other end protrudes outwardly from the case 110. A through hole 114 allowing the moving rod 20 to penetrate therethrough may be formed in the front case 113. The moving rod 20 is inserted through the through hole 114 such that a portion thereof is fixed and connected to the movable electrode 150 and the other remaining portion protrudes outwardly from the case 110.

When the movable electrode 150 is completely moved to the closing position P2 as illustrated in FIG. 7, the moving rod 20 partially protrudes outwardly from the case 110.

When the movable electrode 150 is in the opening position P1 as illustrated in FIG. 6, the moving rod 20 protrudes outwardly from the case 110 by a first length H1.

When the movable electrode 150 is moved to the closing position P2 as illustrated in FIG. 7, the moving rod 20 may be moved together with the movable electrode 150 to the interior of the case 110, and a portion corresponding to a second length H2 reduced by a distance over which the movable electrode 150 has been moved from the first length H1 may protrude outwardly from the case 110.

Meanwhile, a moving rod driving mechanism (not shown) pushing the moving rod 20 in the forward direction F may be installed in the arc eliminator 1. The moving rod driving mechanism moves the moving rod 20 in the forward direction F to move the movable electrode 150 fixed and connected to one end of the moving rod 20 to the opening position P1 as illustrated in FIG. 6.

Figure 8:
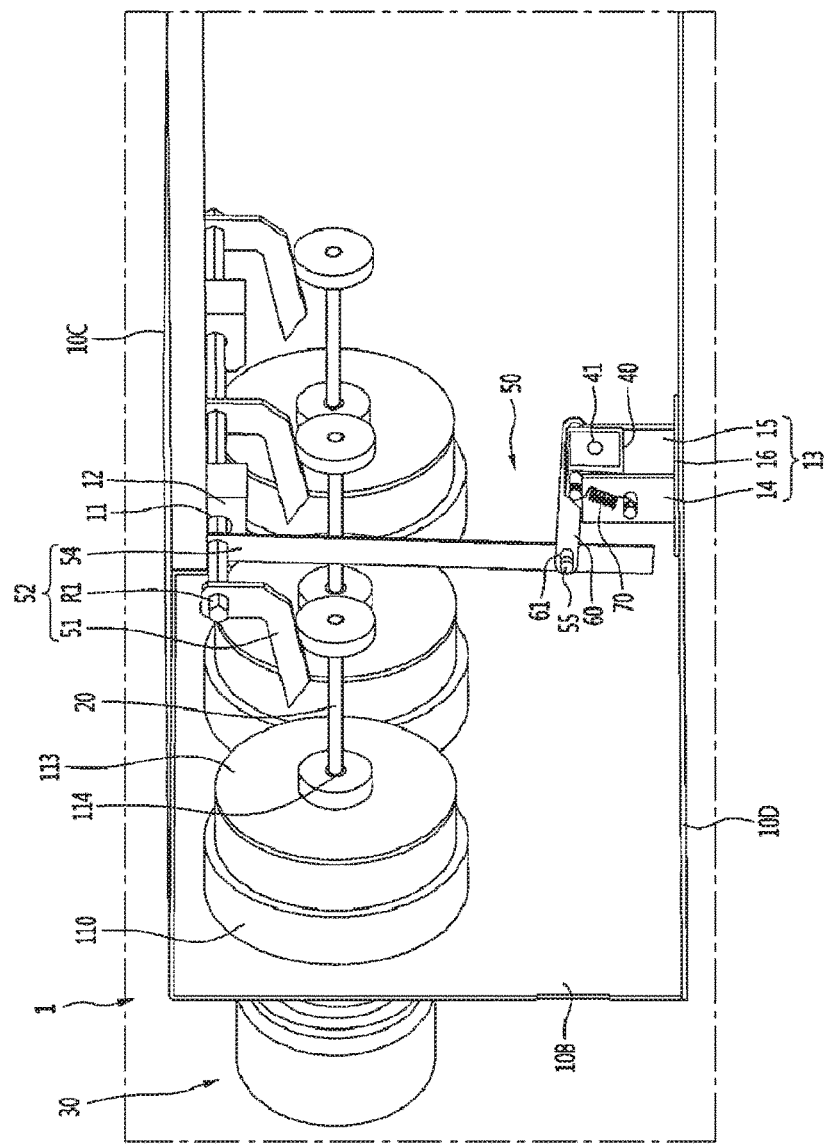
FIG. 8 is a view illustrating an interior of an arc eliminator according to an embodiment of the present disclosure.
Figure 9:
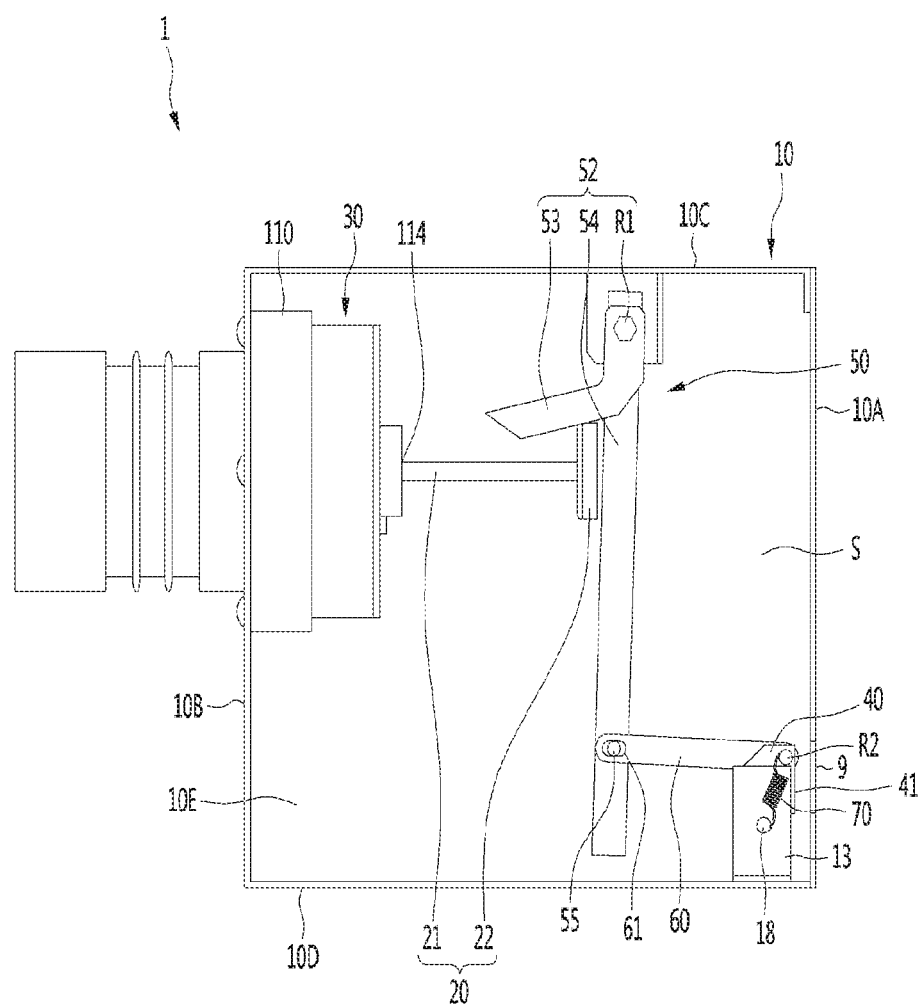
FIG. 9 is a view illustrating an interior of an arc eliminator when the arc eliminator according to an embodiment of the present disclosure is open.
Figure 10:
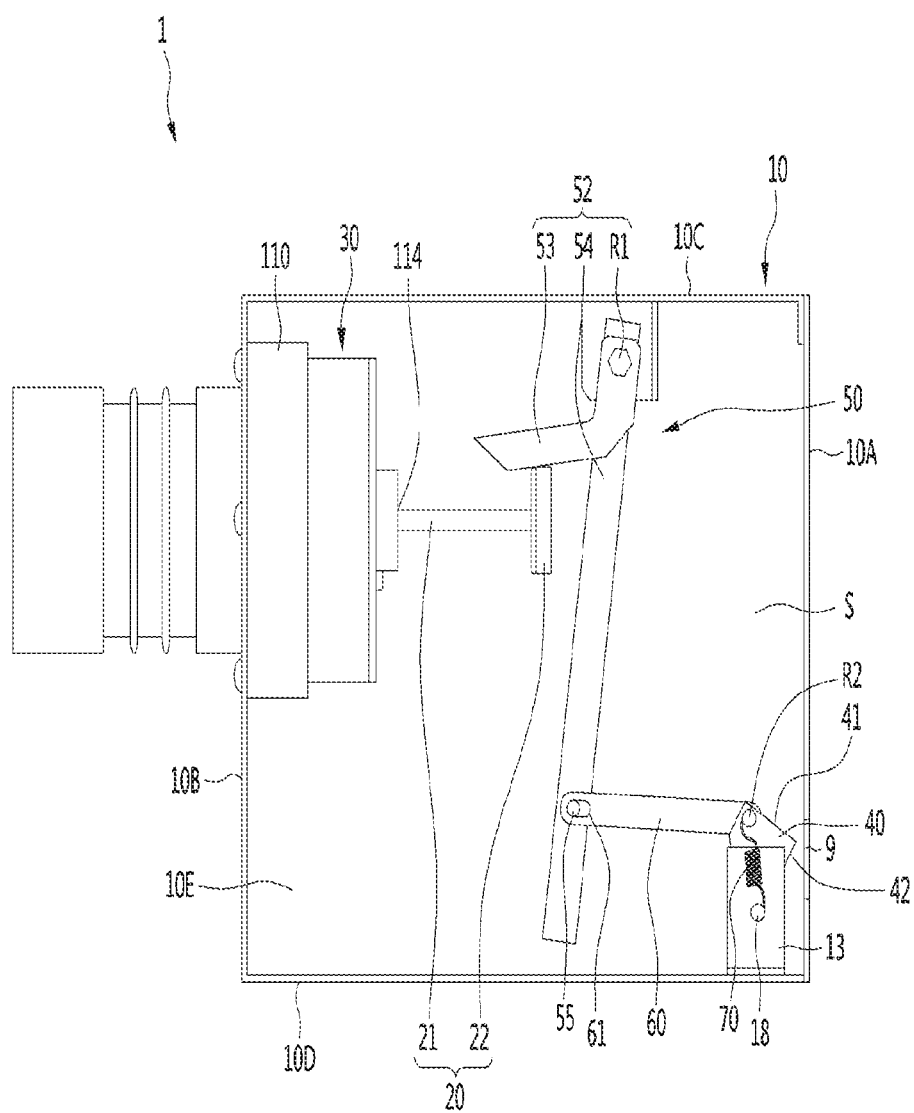
FIG. 10 is a view illustrating an interior of the arc eliminator when closing of the arc eliminator illustrated in FIG. 8 is underway.
Figure 11:
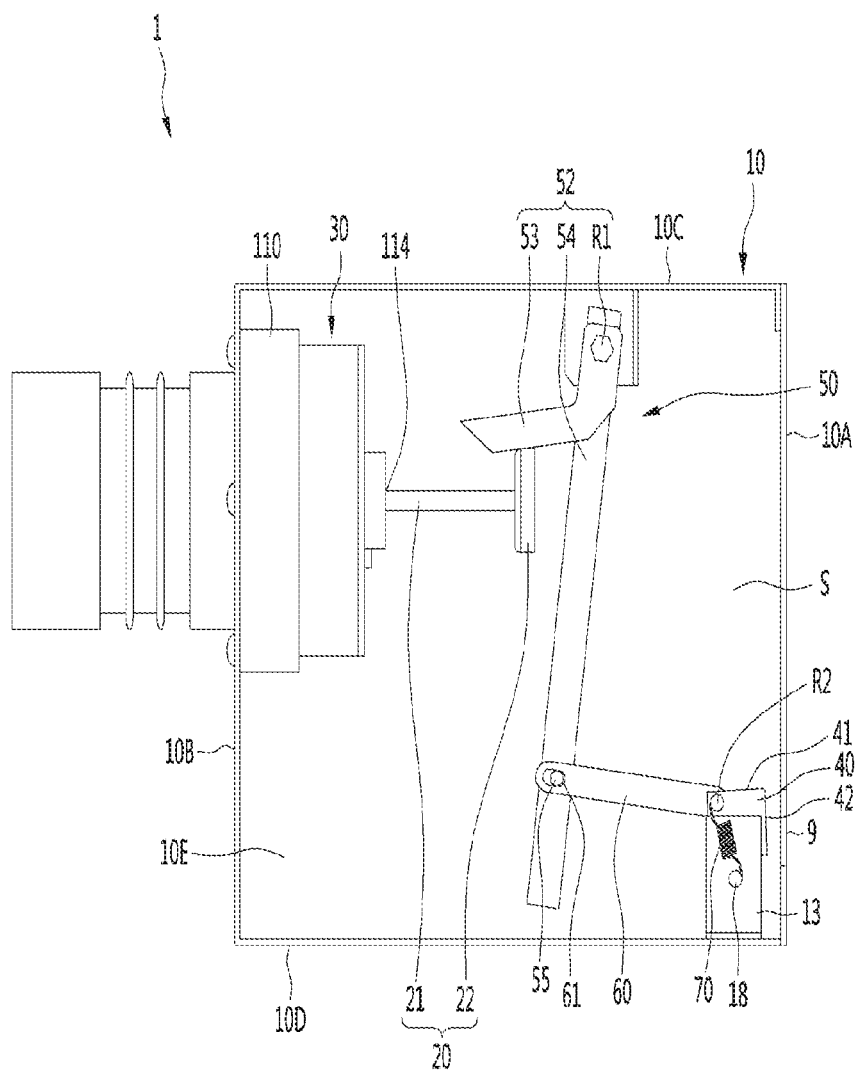
FIG. 11 is a view illustrating an interior of the arc eliminator when closing of the arc eliminator illustrated in FIG. 9 is completed.
Figure 12:
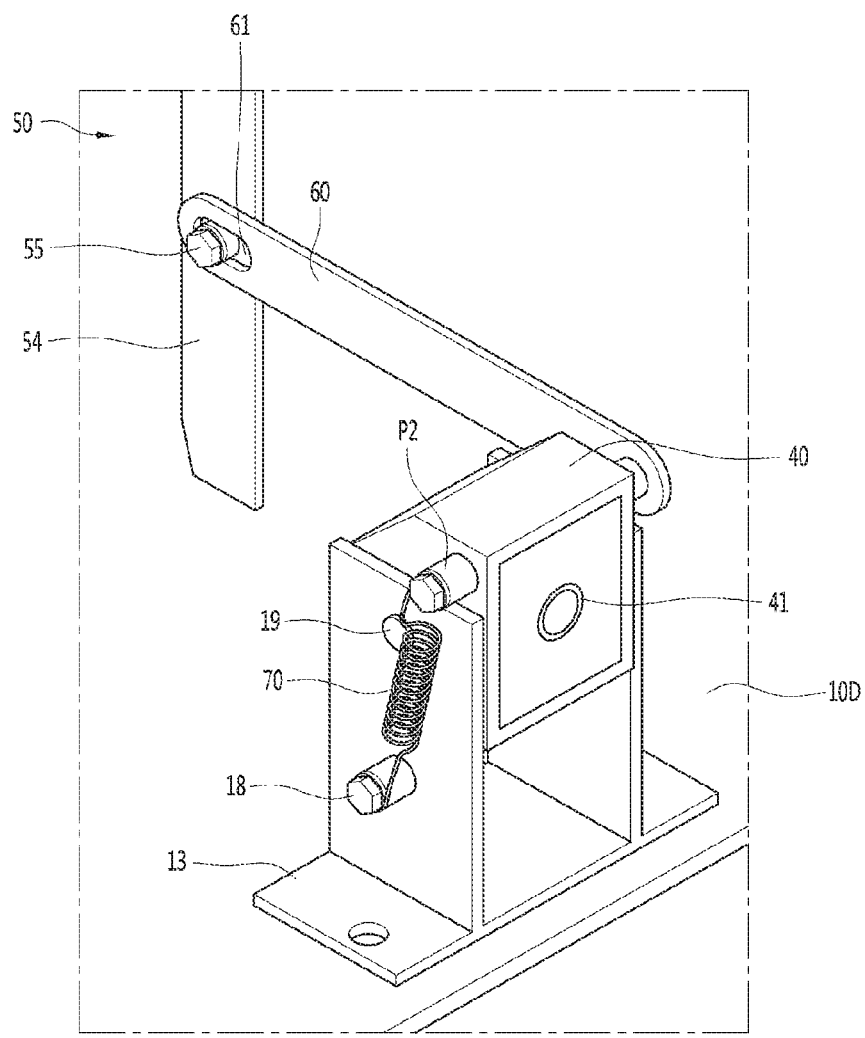
FIG. 12 is a perspective view illustrating an interior of the arc eliminator illustrated in FIG. 8.

FIG. 8 is a view illustrating an interior of an arc eliminator according to an embodiment of the present disclosure, FIG. 9 is a view illustrating an interior of an arc eliminator when the arc eliminator according to an embodiment of the present disclosure is open, FIG. 10 is a view illustrating an interior of the arc eliminator when closing of the arc eliminator illustrated in FIG. 8 is underway, FIG. 11 is a view illustrating an interior of the arc eliminator when closing of the arc eliminator illustrated in FIG. 9 is completed, and FIG. 12 is a perspective view illustrating an interior of the arc eliminator illustrated in FIG. 8.

As illustrated in FIGS. 8 to 12, the arc eliminator 1 may include a housing 10 in which a space S is formed and an opening 9 is formed, an arc extinguishing part 30 installed in the housing 10 and having a moving rod 20 disposed to be movable to the space S, an indicator 40 rotatably installed within the housing 10 and seen through the opening 9, and an indicator rotating mechanism 50 interworking with the moving rod 20 to rotate the indicator 40 when the moving rod 20 is moved.

The housing 10 may form an appearance of the indicator 10.

The housing 10 may include a front plate part 10A, a rear plate part 10B, an upper plate part 10C, a lower plate part 10D, and a side plate part 10E.

When the distribution board door 3 illustrated in FIGS. 1 and 2 is opened, the front plate part 10A of the housing 10 may be seen. The front plate part 10A may form a front appearance of the arc eliminator.

The opening 9 may be formed in the front plate part 10A. The opening 9 may be formed in the front plate part 10A such that it is opened in a forward/backward direction. The opening 9 may have a circular shape or a polygonal shape such as a quadrangular shape, or the like.

The arc eliminator 1 may further include a support 13 rotatably supporting the indicator 40.

The support 13 may be installed in the housing 10. The support 13 may be installed on a rear side of the front plate part 10A of the housing 10. The support 13 may be installed in the lower plate part 10D of the housing 10. The support 13 may be disposed to protrude in an upward direction from the lower plate part 10D of the housing 10.

The support 13 may be installed to be closer to the front plate part 10A than to the rear plate part 10B, among the front plate part 10A and the rear plate part 10B of the housing. The support 13 may be installed to be positioned on the rear side of the opening 9.

The support 13 may include a pair of support plates 14 and 15 spaced apart from each other at a interval greater than a width of the indicator 40. The indicator 40 may be installed to be positioned between the pair of support plates 14 and 15.

The support 13 may further include a lower plate 16 supporting the pair of support plates 14 and 15. The pair of support plates 14 and 15 may be disposed to be spaced apart from each other in a traverse direction on an upper side of the lower plate 16.

The lower plate 16 may be installed on the lower plate part 10D of the housing 10 by a fastening member such as a screw, or the like.

The support 13 may be configured such that an upper surface, a front surface, and a rear surface thereof are opened. When the indicator 40 is mounted, the support 13 may be bent in a direction in which upper portions of the pair of support plates 14 and 15 become away from each other.

The moving rod 20 may include a rod 21 protruding from the arc extinguishing part 30 to the space S and a contact body 22 disposed on one side of the rod 21.

The rod 21 may be disposed to penetrate through the through hole 114 of the arc extinguishing part 30.

The contact body 22 may be in contact with the indicator rotating mechanism 50 to operate the indicator rotating mechanism 50. The contact body 22 may be in contact with a rotary link 52 (to be described hereinafter) of the indicator rotating mechanism 50.

The arc extinguishing part 30 may be formed to have a structure capable of extinguishing an arc. The arc extinguishing part 30 may be disposed to penetrate through the rear plate part 10B of the housing 10. A front portion of the arc extinguishing part 30 may be positioned within the space S and a rear portion thereof may be positioned on the rear side of rear plate part 10B. The arc extinguishing part 30 may have the through hole 114 through which the moving rod 20 penetrates.

The indicator 40 may include the first indicator 41 seen through the opening 9 when the moving rod 20 is moved toward outside of the arc extinguishing part 30 and the second indicator 42 seen through the opening 9 when the moving rod 20 is moved toward the interior of the arc extinguishing part 30.

The indicator 40 may be configured as a polyhedron. The first indicator 41 may be formed on a first surface of the polyhedron. The second indicator 42 may be formed on a second surface of the polyhedron perpendicular to the first surface. When the moving rod 20 moves forwards according to an opening state of the arc extinguishing part 30, the first indicator 41 may be positioned on the rear side of the opening 9 and seen outwardly through the opening 9. Conversely, when the moving rod moves backwards according to a closing state of the arc extinguishing part 30, the second indicator 42 may be positioned on the rear side of the opening 9 and seen through the opening 9.

The indicator 40 may be positioned on the rear side of the opening 9. The indicator 40 may be rotated in a clockwise or counterclockwise direction, centered on a rotation central axis thereof, between the pair of support plates 14 and 15.

The indicator 40 may have a central shaft (not shown) rotatably supported by the pair of support plates 14 and 15 on a surface perpendicular to the first surface and the second surface.

The central shaft of the indicator 40 may be inserted into and supported in a central shaft support 19 formed in the pair of support plates 14 and 15. The central shaft of the indicator 40 may be formed to be horizontal to the indicator 40, and the indicator 40 may be rotated around the central shaft horizontal thereto. The central shaft of the indicator 40 may be a rotation center of the indicator 40, and when a connection link 60 (to be described hereinafter) moves in a backward direction or in a forward direction, the indicator 40 may be rotated about the central shaft.

The indicator 40 may enter between the pair of support plates 14 and 15, and the central shaft (not shown) thereof may be inserted into a central shaft support unit 19. When the central shaft is inserted into the central shaft support unit 19, the pair of support plates 14 and 15 may be elastically restored so as to be positioned in a mutually parallel direction, and the indicator 40 may be rotatably supported by the pair of support plates 14 and 15.

When the indicator 40 is inserted and installed between the pair of support plates 14 and 15, upper portions of the pair of support plates 14 and 15 may be curved in a direction in which the upper portions become away from each other, to help the indicator 40 be smoothly inserted and installed, and when the central shaft of the indicator is inserted into the central shaft support unit 19 so installation of the indicator 40 is completed, the pair of support plates 14 and 15 are restored to be parallel to each other, stably supporting the indicator 40.

The indicator rotating mechanism 50 may include the rotary link 52 and a connection link 60.

The rotary link 52 is rotatably supported in the housing 10, and when the moving rod 20 moves, the rotary link 52 may be rotated about a first rotational shaft R1.

The rotary link 52 may include a first link part 53 installed in the first rotational shaft R1 and contacting an outer end of the contact body 22 and a second link portion 54 installed in the first rotational shaft R1 allowing the connection link 60 to be connected thereto.

The first link part 53 may include a first rotational shaft connection portion connected to the first rotational shaft R1 and a bent portion bent from the first rotational shaft connection portion so as to be mounted on the contact body 22 and rotated by the contact body 22.

The second link portion 54 may be positioned to extend in a substantially vertical direction within the arc eliminator. An upper portion of the second link portion 54 may be integrally rotatably connected to the first rotational shaft R1 and a lower portion thereof may extend to a rear side of the support 13 or the indicator 40.

A first rotational shaft supporter 12 may be disposed in the housing 10, and have a through hole 11 allowing the first rotational shaft R1 of the indicator rotating mechanism 50 to rotatably pass therethrough.

The first rotational shaft supporter 12 may be a rotational link supporter rotatably supporting the rotary link 52 of the indicator rotating mechanism 50.

The first rotational shaft supporter 12 may be installed to be positioned in an inner upper portion of the housing 10. The first rotational shaft supporter 12 may be installed on the upper plate part 100 of the housing 10. The first rotational supporter 12 may be installed to protrude downwardly from the upper plate part 10C of the housing 10. The through hole 11 may be formed to be open in a horizontal direction in the first rotational shaft supporter 12.

The connection link 60 may be connected to the rotary link 52 and moves forwards and backwards when the rotary link 52 rotates. The connection link 60 may be connected to the indicator 40 by the second rotational shaft R2 to rotate the indicator 40.

When the rotary link 52 rotates, the connection link 60 may be pulled in a backward direction or may be pushed in a forward direction. When the connection link 60 pushes one side of the indicator 40 in a backward direction, the indicator 40 may be rotated around a rotation center, and when the connection link 60 pushes one side of the indicator 40 in a forward direction, the indicator 40 may be rotated around the rotation center. The connection link 60 may be connected to a portion other than the rotation center of the indicator 40.

When the connection link 60 moves forwards and backwards, the indicator 40 may be rotated by the second rotational shaft R2, centered on the central axis. In a state in which the connection link 60 moves forwards as illustrated in FIG. 9, when the connection link 60 moves backwards as illustrated in FIG. 10, the connection link 60 may pull the second rotational shaft R2 in the backward direction and the second rotational shaft R2 may rotate the indicator 40 in a counterclockwise direction of FIG. 10.

When the indicator 40 rotates in the counterclockwise direction, the first indicator 41 positioned on the rear side of the opening 9 may be oriented substantially upwards, and here, the second indicator 42 may be rotated in a backward direction of the opening 9 and seen through the opening 9.

A guide protrusion 55 may protrude from any one of the rotary link 52 and the connection link 60, and a guide hole 61 to which the guide protrusion 55 is guided may be formed in the other of the rotary link 52 and the connection link 60. The guide protrusion 55 may be installed to protrude substantially laterally in a lower portion of the second link portion 54. In this case, the guide hole 61 may be formed to extend in a forward/backward direction of the connection link 60 and opened in a horizontal direction.

Meanwhile, the arc eliminator 1 may further include an elastic member 70 connected the second connection shaft R2. The elastic member 70 may be configured as a spring such as a coil spring which is compressed or stretched. One end portion of the elastic member 70 may be connected to an elastic member connection shaft 18 (to be described hereinafter) and the other end portion thereof may be connected to the second connection shaft R2.

The elastic member 70 may be varied in length according to positions of the connection link 60. The elastic member 70 may be compressed when the connection link 60 moves forwards in a direction toward the front plate part 10A of the housing 10 as illustrated in FIG. 9, and may be stretched when the connection link 60 moves backwards in a direction away from the front plate part 10A of the housing 10 as illustrated in FIG. 11.

The elastic member 70 may be a return spring for returning the connection link 60 in a direction toward the front plate part 10A of the housing 10 as illustrated in FIG. 9. When the connection link 60 is not pulled by the rotary link 52, the elastic member 70 may move the connection link 60 in a direction toward the front plate part 10A of the housing 10 as illustrated in FIG. 9.

The support 13 may further include the elastic member connection shaft 18 to which one end portion of the elastic member 70 is connected. The elastic member connection shaft 18 may be installed in any one of the pair of support plates 14 and 15.

When the actuator does not perform a closing operation, the first indicator 41 of the indicator 40 may rotate the indicator 40 such that the indicator 40 is seen from the outside, and in this case, the arc eliminator 1 may indicate outwardly that the arc extinguishing part 30 is currently in an opening state.

Conversely, when the actuator performs the closing operation, the elastic member 70 may be stretched as illustrated in FIG. 11, and here, the second indicator 42 of the indicator 40 may be positioned on the rear side of the opening 9, indicating that the arc extinguishing part 30 is currently in a closing state.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An arc eliminator comprising:
   a housing having a space formed therein and including an opening;
   an arc extinguishing part installed in the housing and including a moving rod disposed to be movable to the space;
   an indicator rotatably installed within the housing and seen through the opening; and
   an indicator rotating mechanism interworking with the moving rod when the moving rod moves, to rotate the indicator.

2. The arc eliminator of claim 1, wherein the indicator includes:
   a first indicator seen through the opening when the moving rod moves toward the outside of the arc extinguishing part; and
   a second indicator seen through the opening when the moving rod moves toward an interior of the arc extinguishing part.

3. The arc eliminator of claim 2, wherein
   the indicator is configured as a polyhedron,
   the first indicator is formed on a first surface of the polyhedron, and
   the second indicator is formed on a second surface of the polyhedron perpendicular to the first surface of the polyhedron.

4. The arc eliminator of claim 1, wherein the indicator is positioned on a rear side of the opening.

5. The arc eliminator of claim 1, wherein the indicator rotating mechanism includes:
   a rotary link rotatably supported in the housing and rotated centered around a first rotational shaft when the moving rod moves; and
   a connection link connected to the rotary link and moving forwards and backwards when the rotary link rotates, and connected to the indicator by a second rotational shaft to rotate the indicator.

6. The arc eliminator of claim 5, wherein a first rotational shaft supporter having a through hole formed to allow the first rotational shaft to rotatably penetrate therethrough is disposed within the housing.

7. The arc eliminator of claim 5, wherein the moving rod includes:
   a rod disposed to move forwards and backwards in the arc extinguishing part; and
   a contact body installed on one side of the rod and contacting the rotary link.

8. The arc eliminator of claim 7, wherein the rotary link includes:
   a first link portion installed in the first rotational shaft and contacting an outer end of the contact body; and
   a second link portion installed in the first rotational shaft and allowing the connection link to be connected thereto.

9. The arc eliminator of claim 5, further comprising:
   a support installed in the housing and rotatably supporting the indicator.

10. The arc eliminator of claim 9, further comprising:
    an elastic member connected to the support and a connection shaft.

11. The arc eliminator of claim 10, wherein the support includes an elastic member connection shaft to which one end portion of the elastic member is connected.

* * * * *